United States Patent [19]
Iida

[11] Patent Number: 5,741,457
[45] Date of Patent: Apr. 21, 1998

[54] METHOD FOR INTRODUCING MOLD MATERIALS INTO A MOLD

[75] Inventor: Kennosuke Iida, Saitama, Japan

[73] Assignees: Akebono Brake Industry Co., Ltd., Tokyo; Akebono Research and Development Centre Ltd., Hanyu, both of Japan

[21] Appl. No.: 602,603

[22] Filed: Feb. 16, 1996

[30] Foreign Application Priority Data

Feb. 17, 1995 [JP] Japan ................................ 7-029454

[51] Int. Cl.⁶ .................................................. B29C 43/58
[52] U.S. Cl. ...................... 264/40.4; 141/9; 264/40.1; 425/145; 425/148; 425/150
[58] Field of Search ........................ 264/40.4, 40.1; 425/148, 145, 150; 141/9

[56] References Cited

U.S. PATENT DOCUMENTS

| | | | |
|---|---|---|---|
| 1,198,426 | 9/1916 | Edison | 141/9 |
| 2,309,571 | 1/1943 | Bruce | 264/120 |
| 3,088,713 | 5/1963 | Gard | 141/9 |
| 3,216,464 | 11/1965 | Horst | 141/9 |
| 4,038,531 | 7/1977 | Loe | 425/148 |
| 5,614,135 | 3/1997 | Maleczek | 264/40.4 |

*Primary Examiner*—James Derrington
*Attorney, Agent, or Firm*—Morgan, Lewis & Bockius LLP

[57] ABSTRACT

A mold material introducing apparatus for introducing mold materials into a mold includes material supplying means for supplying a predetermined amount of mold material into the mold, moving means for moving the mold relative to the material supplying means and vice versa, and control means for outputting command signals to those means. The control means divides the inside of the mold into segments and assigns addresses to those segments, and controls the material supplying means and the moving means so that a predetermined amount of a predetermined mold material is located at each of the address locations. Accordingly, the mold materials of different kinds that are led into the mold are dispersed in a predetermined state.

3 Claims, 4 Drawing Sheets

METHOD FOR INTRODUCING MOLD MATERIALS INTO A MOLD

BACKGROUND OF THE INVENTION

1. Field of the Invention

The present invention relates to an apparatus and a method for introducing mold materials into a mold.

2. Description of the Prior Art

The method of manufacturing frictional materials (e.g., brake pads, brake lining, and clutch facing) of brakes or clutches comes in two varieties; a dry method and a wet method.

In the dry method, all of raw materials (mold materials), such as thermosetting binder, e.g., phenolic resin, fibrous reinforcement, e.g., glass fiber and aramid fiber, friction adjusting modifier, e.g., rubber dust, cashew dust, metal powder, and the like, are uniformly mixed and agitated, the mixed raw materials are preformed within a mold, this preformed subject is set in a heat mold with a back plate set therein, heat-formed under pressure, thereby to form a friction material united with the back plate, and the friction material is subjected to a heat treatment process. In the wet method, all of the raw materials are uniformly mixed and agitated and wetted, and the wetted mixed raw materials are dried and heat-formed.

In manufacturing friction materials, the mixture of raw materials filled in the mold must be uniformly dispersed to secure the quality of the friction material. Accordingly, a uniform dispersion of the raw materials is required in the step of agitating the raw materials. To this end, it is necessary to measure a degree of the dispersion of the raw materials. However, the measurement of the material dispersion is very difficult. The difficulty of measuring the material dispersion is problematic in the product quality control. Usually, qualitative measures are taken for the measurement and control of the dispersion degree. For example, the mold materials within the mold are visually observed with one's eyes or a light meter (measuring reflected light) is used.

However, the qualitative measures suffer from the following problems. The measured values vary depending on the kinds of the materials used, and the size and the shape of material particles, and the like. The reference values for acceptable or not acceptable are unclear.

SUMMARY OF THE INVENTION

Accordingly, an object of the present invention is to provide a mold material introducing method which enables raw materials to be introduced into the mold so that the materials are dispersed therein in a satisfactory state.

Another object of the present invention is to provide a mold material introducing apparatus which enables raw materials to be introduced into the mold so that the materials are dispersed therein in a satisfactory state.

Yet another object of the present invention is to provide a mold material introducing apparatus which enables raw materials of a friction material to be introduced into a mold so that the materials are dispersed therein in a predetermined state.

There is provided a method for introducing mold materials into a mold comprising the steps of: A) preparing a plurality of mold materials; B) supplying one of the mold materials; C) measuring a predetermined amount of the supplied mold material; D) feeding the measured mold material to a predetermined location in the mold; and E) repeating the steps B) to D) with supplying other mold materials in the step of B).

Further, there is provided a mold material introducing apparatus for introducing mold materials into a mold comprising: material supplying means for supplying a predetermined amount of mold material into the mold; moving means for moving the mold relative to the material supplying means and vice versa; and control means for outputting command signals to the material supplying means and the moving means so as to disperse the different kinds of the mold materials into the mold according to a predetermined state.

DETAILED DESCRIPTION OF THE PREFERRED EMBODIMENT

Figure 1:
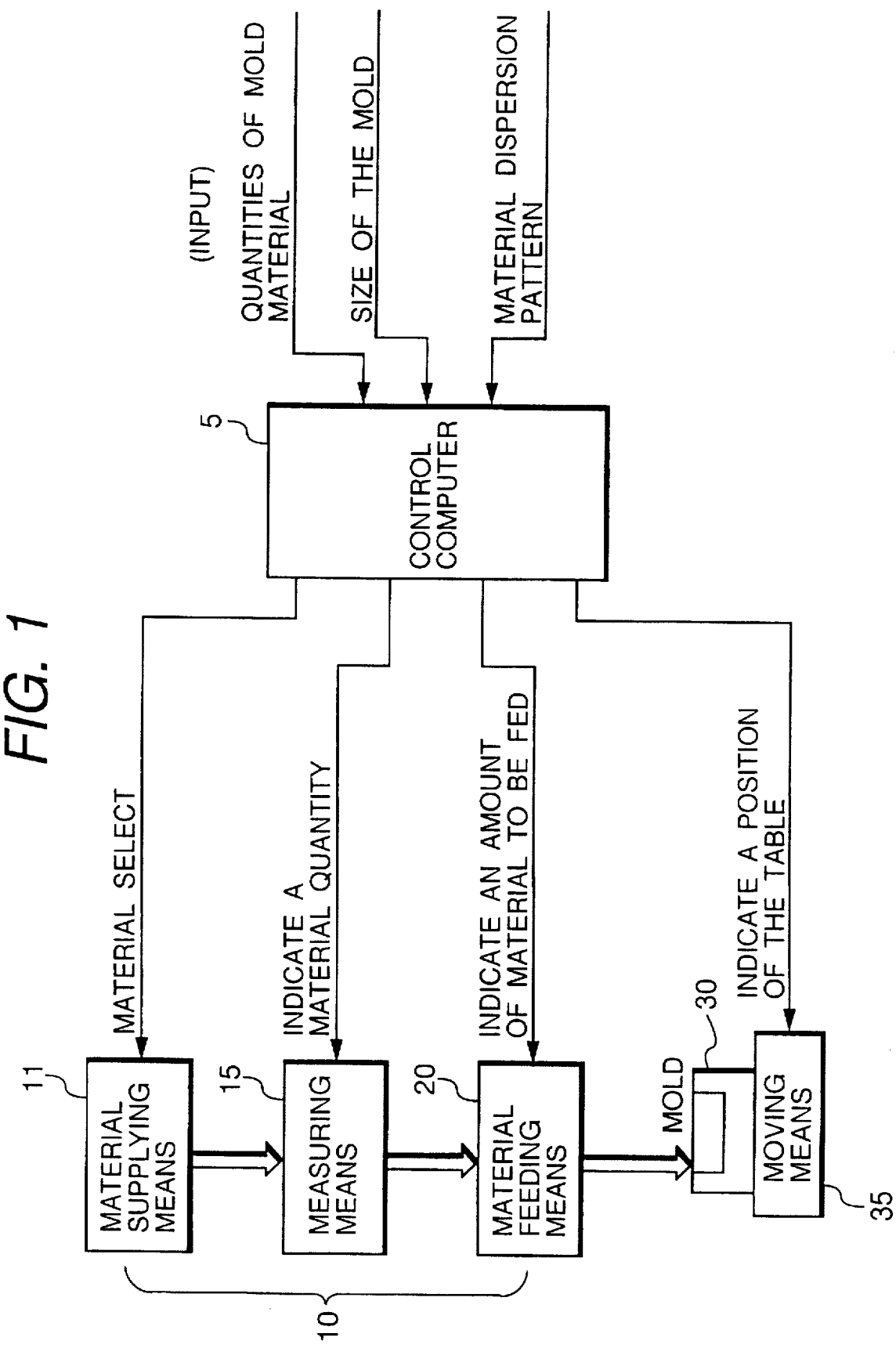
FIG. 1 is a block diagram showing the construction of a mold material introducing apparatus according to an embodiment of the present invention.

The preferred embodiment of the present invention will be described with reference to FIGS. 1 to 5.

A mold material introducing apparatus according to the embodiment of the present invention comprises material supplying means 10 for supplying a predetermined amount of mold material into a mold 30, moving means 35 for moving the mold 30 relative to the material supplying means 10 and vice versa and control means 5 for outputting signals to the material supplying means 10 and the moving means 35.

The material supplying means 10 includes a material providing means 11 for providing a predetermined mold material, a measuring means 15 for measuring a predetermined quantity of the mold material and a material feeding means 20 for feeding the mold material measured by the measuring means 15 to the mold 30.

Figure 2:
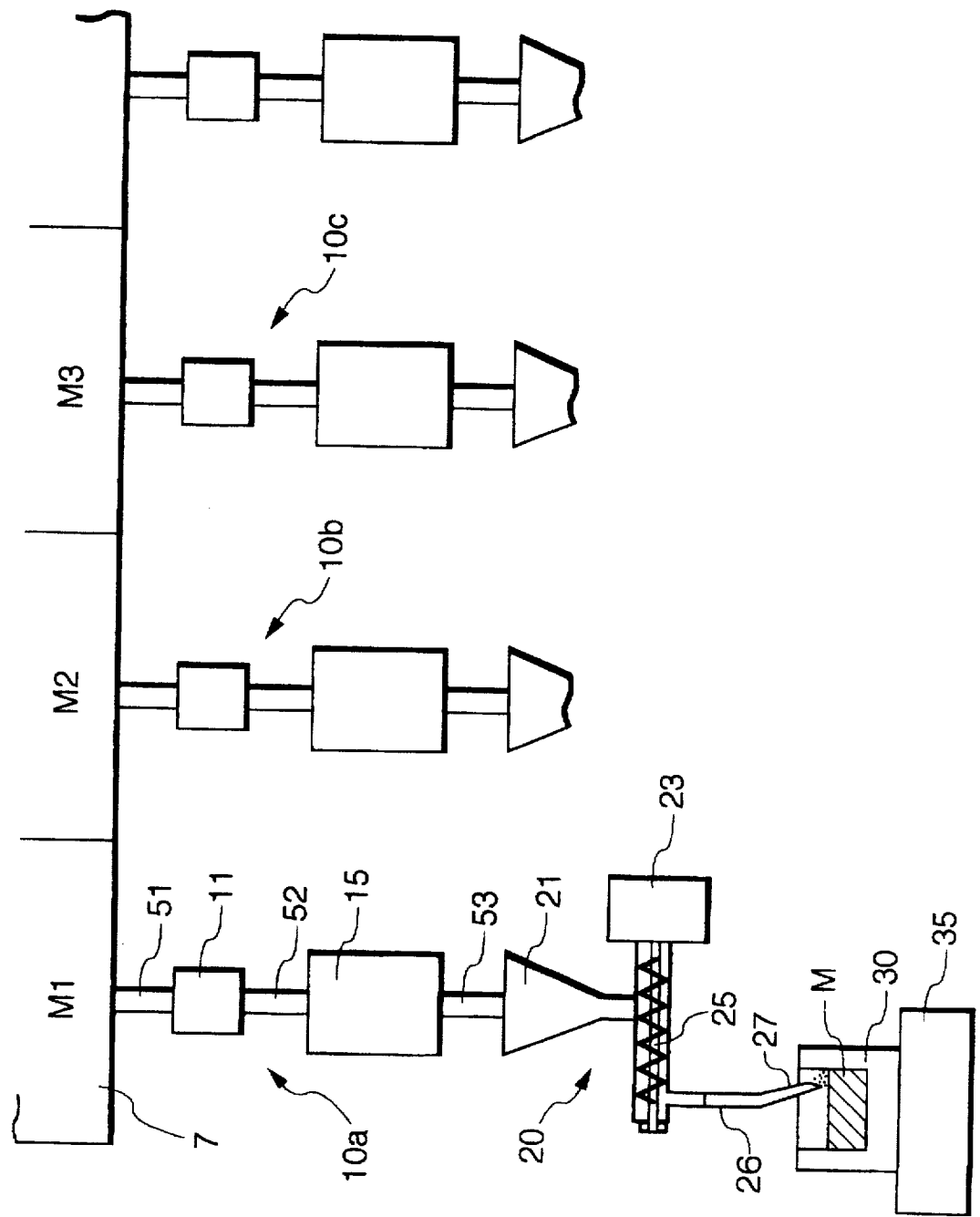
FIG. 2 is a front view showing the mold material introducing apparatus of the embodiment of the present invention.

The material providing means 11 includes an electromagnetic valve operated between an open and closed positioned by a signal from the control means 5. As Illustrated in FIG. 2, the upper part of the material providing means 11 is connected through a pipe 51 to a container 7 for containing the mold material.

The measuring means 15 measures a predetermined quantity of the mold material supplied through a pipe 52 by the material providing means 11 in response to a signal indicative of the predetermined quantity transmitted from the control means 5. In this case, the measuring means 15 measures the quantity of the mold material by weight or volume of the mold material.

The material feeding means 20 includes a hopper 21 for receiving the measured mold material through a pipe 53 from the measuring means 15, a feed screw machine 25 located under the hopper 21 for feeding forward the mold material and a motor 23 for driving the feed screw machine 25. The material feeding means 20 is arranged so as to feed a minute amount of the mold material at a fixed speed in a manner that the motor speed of the motor 23 and the pitch of the screw are properly selected depending on the characteristics of the material. A feed pipe 26 is connected to the distal end of the feed screw machine 25. A material feeding port 27 from which the mold material is discharged is formed at the tip of the feed pipe 26.

The mold 30 is firmly mounted on a movable table 35 as a moving means. The movable table 35 is movable in two-dimensional directions, vertically and horizontally, whereby the mold 30 may variably be positioned to the feeding port 27.

Incidentally, a robot handle that is movable in the two-dimensional directions while gripping a mold therewith may be adopted as an another example of the moving means.

Further, the moving means may be constructed so as to move the material supplying portion (material feeding means) of the material supplying means in two-dimensional directions. The means to move the mold may be combined with the means to move the material supplying means. The moving means may also be moved in three-dimensional directions, that is, the moving means is also movable in the upward and downward direction.

The control means 5 may be made up of a central processing unit (CPU), a random access memory (RAM), a read only memory (ROM), and an input/output (I/O) unit, those components being connected by buses.

Further, the control means may be constructed so as to three-dimensionally divide the inner volume of the mold into segments, and assign addresses to these segments, and control the material supplying means and the moving means, whereby the mold materials are successively introduced into the mold so that a predetermined amount of a predetermined mold material is located at each of the address locations in the order from the lowest position address to the highest position address.

The material supplying means 10 consists of a plural number of material supplying units so as to handle plural of mold materials. The number of the material supplying units is equal to or larger than the number of mold materials. A mold material M1 is led into the mold 30 by the material supplying unit 10a. Another mold material M2 is led into the mold 30 by the material supplying unit 10b. Yet another mold material M3 is led into the mold 30 by the material supplying unit 10c. Such a construction includes the containers 7 in equal number to the mold materials, and the material supplying means consisting of only one material supplying unit is allowed for some specific arrays of the mold materials within the mold. In the aforementioned construction, one material supplying unit is connected to the plurality of containers.

Each of the mold materials may consist of raw material of the same kind or composite particles each containing raw materials of different kinds. Alternatively, raw materials of which the specific gravities are close to each other are mixed into one raw material. The composite particles are formed in a manner that binding agglomerate containing water-alcohol mixture solvent is added to several kinds of raw materials being dry mixed, the resultant mixture is wet out to have a viscosity, and the wet-out mixture is pulverized into granular material.

Figure 3:
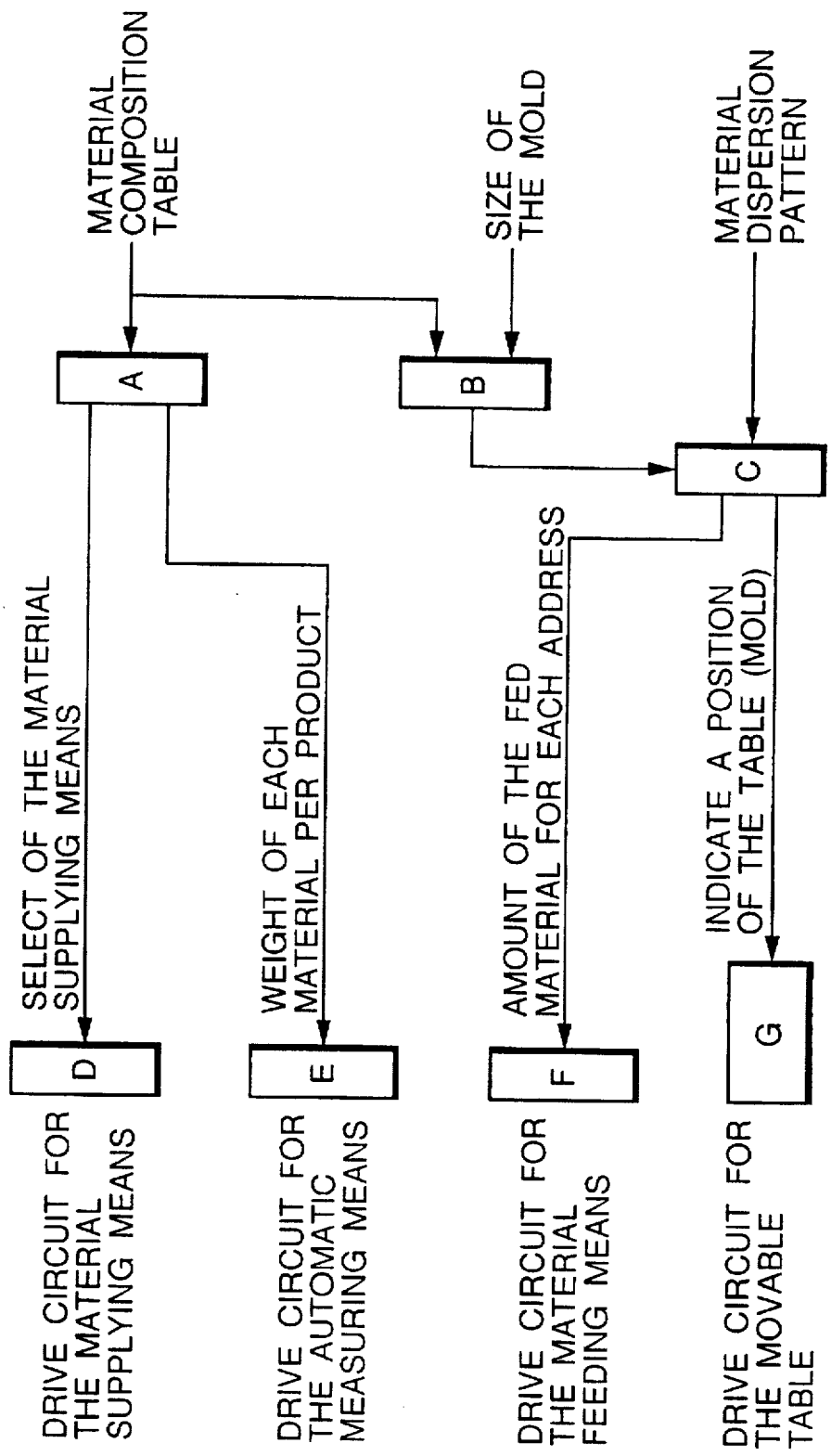
FIG. 3 is a block diagram showing a logic in the control means of the embodiment of the present invention.

A logic of the control means 5 will be described with reference to FIG. 3.

A mix setting circuit A registers in its memory a mix table of each product, i.e., the weight of each mold material used, and determines the order of feeding the respective mold materials. The mix setting circuit A outputs a signal, which is for selecting one of the material supplying means respectively assigned to the mold materials, to the drive circuit D of the material supplying means. The mix setting circuit A further outputs a signal, which is indicative of the weight of each mold material for each product, to a drive circuit E of the measuring means.

Next, the weight of each mold material used, which is registered by the mix setting circuit A, and the size of each molded product are input into an address setting circuit B. In an address setting circuit B, a design volume of each molded product is divided into a predetermined number of segments (e.g., 10000 segments). Addresses are assigned to those segments. That is, the addresses of each molded product are set (in the mold). The address setting circuit B outputs address information and information of the weight of the mold material per address to a feed-quantity/position setting circuit C.

A dispersion pattern of the material is inputted to the feed-quantity/position setting circuit C. In accordance with the dispersion pattern, the feed-quantity/position setting circuit C outputs a signal indicative of the quantity of the feeding mold material per address to a drive circuit F of the material feeding means, and further a signal, which indicates a position of the table (or the mold), to a drive circuit G of the movable table. As for the dispersion pattern, when all of the materials are uniformly dispersed and arrayed in the mold, the weight of the material assigned to each address is the quotient of dividing the total weight of each product by the number of addresses. Where it is desired to incline a packing density, for example, of the material in accordance with the required performance of the molded product, a gradient of the packing density is set based on the required performance, and the quantity of the feeding material per address is determined by the gradient.

The drive circuits D, E, F, and G sends command signals to the material providing means 11, the measuring means 15, the material feeding means 20, and the movable table 35.

Figure 4:
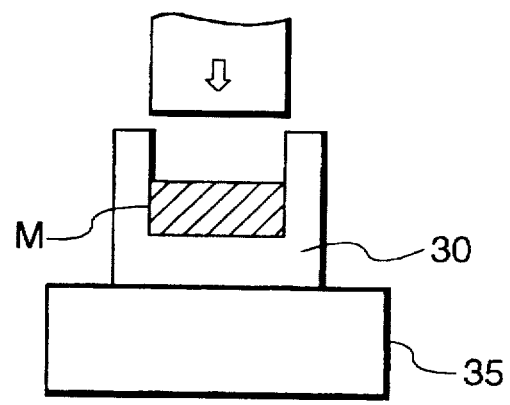
FIG. 4 is a diagram showing a step of pressing a mold material led into the mold by the mold material introducing apparatus.
Figure 5:
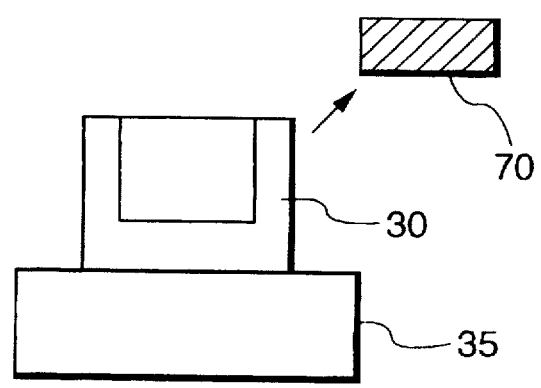
FIG. 5 is a diagram showing a molded product formed through the pressing work.

FIG. 4 is a diagram showing a state that a mold material M is introduced into the mold by the mold material introducing apparatus of the present invention, and is ready for the step of pressing work. FIG. 5 is a diagram showing a molded product 70 formed through the pressing work.

As seen from the foregoing description, the mold material introducing apparatus of the present invention can introduce the mold materials into the mold with the omission of the step of mixing and agitating the mold materials. In the mold, consisting of several types of raw materials, introduced thereinto are dispersed in a predetermined state. The result is the improvement of the product performances.

According to the present invention, there is provided a mold material introducing method which enables raw materials to be introduced into the mold so that the materials are dispersed therein in a satisfactory state.

The invention provides a mold material introducing apparatus which introduces mold materials into the mold so that the raw materials are dispersed therein in a satisfactory state.

Further, the invention provides a mold material introducing apparatus which introduces mold materials into the mold so that the raw materials are dispersed in a predetermined state. The result is the improvement of the product performances.

The control means divides the inside of the mold into a predetermined number of segments and assigns addresses to those segments. A predetermined amount of the mold material selected for each address is fed into the mold. Accordingly, the mold materials are dispersed in a predetermined state in the mold.

The mold materials are contained in their containers, respectively. Material that is taken out of the container is measured, and a proper amount of the material is fed into the mold. Accordingly, the material is reliably and accurately led into the mold.

The moving means moves the mold relative to the material supplying means and vive versa. Therefore, a desired mold material can stably and accurately be located at a predetermined position in the mold. Incidentally, where the mold and the material supplying means are disposed in a state that these are movable in three-dimensional directions respectively, a new mold material may be fed to an address location at a position in proximity with the mold material already packed in the mold. Therefore, a predetermined mold material can exactly be set at a predetermined position in the mold.

If the inner volume of the mold is three-dimensionally divided into segments, and addresses are assigned to these segments, the mold material may be dispersed more satisfactorily within the mold.

The mold materials are led into the mold so that the materials are dispersed therein as designed. Therefore, the material may be led into the mold so that the packing density of the material is changed every location in accordance with the required performances of the products. Accordingly, the physical properties of the molded product, such as strength and flexibility, are improved.

A step of mixing and agitating the mold materials is omissible in the manufacturing process of the molded products. This leads to reduction of cost to manufacture.

What is claimed is:

1. A method for introducing mold materials into a mold comprising the steps
   A) preparing a plurality of mold materials;
   B) inputting the desired material composition, size of the mold, and desired material dispersion pattern into a control unit;
   C) dividing the inside of the mold into segments and assigning addresses to those segments;
   D) generating a first control signal from said control unit to a material supply unit and selecting one mold material to be supplied to a material measuring unit in accordance with said first control signal;
   E) generating a second control signal from said control unit to a material measuring unit and measuring said one mold material in accordance with said second control signal;
   F) generating a third control signal from said control unit to a material feed unit and feeding said one mold material to said mold in accordance with said third control signal;
   G) generating a fourth control signal from said control unit to cause said one mold material fed by said material feed unit to be fed to a specified address within the mold; and
   H) repeating steps D) through G) using different mold materials.

2. The method for introducing mold materials into a mold of claim 1 wherein, said mold is moved in accordance with said fourth control signal.

3. The method for introducing mold materials into a mold of claim 1 wherein, said material feed unit is moved in accordance with said fourth control signal.

* * * * *